(12) United States Patent
Idei et al.

(10) Patent No.: US 7,270,207 B2
(45) Date of Patent: Sep. 18, 2007

(54) AIR INTAKE SYSTEM FOR VEHICLE COMBUSTION ENGINE

(75) Inventors: Shoji Idei, Kakogawa (JP); Keishi Fukumoto, Akashi (JP); Masashi Fukuuchi, Kobe (JP); Takashi Fukami, Akashi (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 145 days.

(21) Appl. No.: 10/650,955

(22) Filed: Aug. 28, 2003

(65) Prior Publication Data

US 2004/0050357 A1   Mar. 18, 2004

(30) Foreign Application Priority Data

Sep. 13, 2002 (JP) ............... 2002-268953

(51) Int. Cl.
*B60K 11/00* (2006.01)
(52) U.S. Cl. .................. 180/68.3; 180/219
(58) Field of Classification Search ........... 180/68.1, 180/68.3, 89.17, 219, 229; 296/180.1, 78.1
See application file for complete search history.

(56) References Cited

U.S. PATENT DOCUMENTS

| | | | | |
|---|---|---|---|---|
| 4,354,570 A * | 10/1982 | Tanaka et al. | ........... | 180/219 |
| 4,438,828 A * | 3/1984 | Nakagawa | ........... | 180/219 |
| 4,648,474 A * | 3/1987 | Shinozaki et al. | ........... | 180/219 |
| 4,709,774 A * | 12/1987 | Saito et al. | ........... | 180/229 |
| 4,735,178 A * | 4/1988 | Inoue et al. | ........... | 180/219 |
| 4,813,511 A * | 3/1989 | Yamaguchi et al. | ........... | 180/219 |
| 4,830,135 A * | 5/1989 | Yamashita | ........... | 180/229 |
| 4,911,494 A * | 3/1990 | Imai et al. | ........... | 296/78.1 |
| 4,913,256 A * | 4/1990 | Sakuma | ........... | 180/229 |
| 5,490,573 A * | 2/1996 | Hagiwara et al. | ........... | 180/68.1 |
| 6,376,482 B2 * | 4/2002 | Akashe et al. | ........... | 514/182 |
| 6,409,783 B1 * | 6/2002 | Miyajima et al. | ........... | 55/385.3 |
| 6,422,332 B1 * | 7/2002 | Takata et al. | ........... | 180/68.3 |
| 6,619,415 B1 * | 9/2003 | Hasumi et al. | ........... | 180/68.1 |

FOREIGN PATENT DOCUMENTS

| | | |
|---|---|---|
| JP | 07-089475 | 4/1995 |
| JP | 2001-071968 | 3/2001 |
| JP | 2001-152990 | 6/2001 |

* cited by examiner

*Primary Examiner*—Christopher P. Ellis
*Assistant Examiner*—Bridget Avery

(57) ABSTRACT

To provide an air intake system for a vehicle, so simple in structure as to reduce the cost and effective to increase the ram pressure, a front cowling (19) is mounted on a front portion of a vehicle body structure (1). This front cowling (19) has left and right headlight windows (20 and 21) aligned with left and right headlights (22 and 23), respectively, and also has an air intake opening (24) defined therein at a location above the headlight windows (20 and 21) for introducing an external combustion air (A) towards the vehicle engine (E). An intake air passage (35) is provided for introducing the combustion air (A), then entering the air intake opening (24), towards an air cleaner (30) by way of opposite lateral portions of a head tube (3).

10 Claims, 7 Drawing Sheets

AIR INTAKE SYSTEM FOR VEHICLE COMBUSTION ENGINE

BACKGROUND OF THE INVENTION

1. Field of the Invention

The present invention generally relates to an air intake system for a vehicle combustion engine and, more particularly, to the air intake system for supplying a combustion air to the engine mounted on a motorcycle.

2. Description of the Prior Art

The air intake system hitherto employed in a motorcycle will be discussed with particular reference to FIGS. 8A to 8C. As shown in FIG. 8A, the motorcycle has a fairing or front cowling 51 having an air intake opening or air scoop 50 defined therein so as to open forwardly at a location substantially below a headlight 52 for introducing a combustion air A for use in a motorcycle internal combustion engine (not shown). The air scoop 50 is in communication with an air intake duct 55 which is in turn in communication with the motorcycle internal combustion engine in any known manner well known to those skilled in the art.

According to the conventional air intake system shown in FIG. 8A, where the combustion air entering the air scoop 50 is directed to flow over the internal combustion engine towards the rear of the engine, a portion of the air intake duct 55 has to be bent upward so as to extend above the engine. Bending of the air intake duct 55 tends to result in occurrence of a turbulent flow of air being introduced, accompanied by an increased flow resistance enough to reduce the ram pressure of the combustion air being introduced through the intake duct 55.

In the illustrated conventional air intake system, since the point of stagnation SP of the air A flowing along the fairing or front cowling 51 is located around the upper end of the air scoop 50 as shown in FIG. 8A, the conventional air intake system have additional problems. Specifically, when the front or "head" of the motorcycle lowers down due to suspension settings, the stagnation point SP shifts relatively upwardly from the air scoop 50 as shown in FIG. 8B to such an extent as to result in reduction in ram pressure.

On the other hand, when the motorcycle then traveling forwards is, for example, accelerated rapidly with the head of the motorcycle consequently raised upwardly as shown in FIG. 8C, there arises an area S in which a current of air A flowing from below is incapable of entering into the air intake duct 55 through the air scoop 50, being blocked by a lower peripheral lip region 53 of the air scoop 50. Once this occurs, an air intake stream is substantially narrowed and thus, the air A ready to enter the air intake duct 55 will not be sufficiently introduced through the air scoop 50, resulting in reduction of the ram pressure.

If an attempt is made to tailor a lower inner surface 53a adjacent the lower peripheral lip region 53 of the air scoop 50 to represent a downwardly curved guide face to facilitate entry of the air A into the air intake duct 55 through the air scoop 50, because of the presence of a front fender or mudguard above a front wheel, a difficulty is encountered in securing a sufficient space for defining the guide face.

As discussed above, with the conventional air intake system, the ram pressure of the air being introduced tends to vary depending on the position or "posture" of the motorcycle during its travel.

On the other hand, the air intake system is also known in which the air scoop is defined at a relatively high level so as to assume a position between left and right headlights. See, for example, the Japanese Laid-open Patent Publication No. 2001-71968 and, particularly, the paragraph [009] and FIG. 3 thereof. According to this prior art air intake system, the problems discussed hereinabove with reference to FIGS. 8A to 8C may be resolved satisfactorily, but the number of component parts tends to increase with a consequent increase of the cost of manufacture since the left and right headlights have to be disposed independently from each other.

SUMMARY OF THE INVENTION

In view of the foregoing, the present invention has been devised to substantially eliminate the inconveniences discussed above and is intended to provide an air intake system for a vehicle combustion engine, which is simple in structure and capable of contributing to reduction in cost of manufacture and which is effective to increase the ram pressure.

In order to accomplish the foregoing object of the present invention, there is provided in accordance with one aspect of the present invention an air intake system for a vehicle engine which includes a front cowling mounted on a front portion of a vehicle body structure. While the vehicle body structure includes a head tube and at least one headlight, the front cowling has a headlight window aligned with the headlight and also has an air intake opening defined therein at a location above the headlight window for introducing an external combustion air towards the vehicle engine. An intake air passage is provided for introducing the combustion air, then entering the air intake opening, towards an air cleaner by way of opposite lateral portions of the head tube.

According to this aspect of the present invention, since the air intake opening is defined in the front cowling at a location above the headlight and, on the other hand, the combustion air entering the air intake opening can be introduced towards the air cleaner past laterally of the head tube that is positioned generally or substantially level with the air intake opening, a portion of the air intake passage between the air intake opening and the head tube can advantageously extend at a minimized curvature without being unduly bent. Accordingly, the resistance to the flow of the combustion air can advantageously be reduced to allow the ram pressure of the combustion air to increase. Also, since the air intake opening is positioned above the headlight, left and right headlights can be assembled into a single headlight unit and, accordingly, the number of component parts can be reduced accompanied by reduction in cost of manufacture of the vehicle.

In a preferred embodiment of the present invention, the air cleaner is disposed rearwardly of the head tube at a location level with the head tube. This disposition advantageously allows lateral opposite areas of the head tube to be utilized as a part of the air intake passage and, also, since the air cleaner is arranged at a position level with the head tube, it is quite easy to configure the air intake passage extending from the air intake opening to the air cleaner so that it can assume a substantially horizontal position and extend straight.

In another preferred embodiment of the present invention, the vehicle body structure includes a forked main frame including two frame segments, and those frame segments may extend rearwardly from the head tube. Also, the air cleaner may be of a type including a cleaner casing and a cleaner element accommodated within the cleaner casing and is preferably disposed within an internal space delimited between the frame segments. This unique disposition is effective to allow the internal space between the frame segments to be effectively utilized to accommodate the air cleaner at a location substantially level with the head tube.

The present invention in accordance with another aspect thereof also provides an air intake system for a vehicle engine which includes a front cowling mounted on a front portion of a vehicle body structure and having an air intake opening defined therein for introducing an external combustion air towards the vehicle engine. The front cowling also has an upper peripheral portion, opposite side peripheral portions continued from the upper peripheral portion and a lower peripheral portion continued from the side peripheral portions, all of those peripheral portions surrounding the air intake opening. The upper peripheral portion of the front cowling is of a shape swelling outwardly of the front cowling beyond the level of side regions of the front cowling, which side regions extend laterally of the air intake opening. The upper peripheral portion thus defines a curved wall.

According to this second aspect of the present invention, since the provision of the curved wall swelling outwardly, e.g., upwardly allows an upper edge portion of the air intake opening to assume a forwardly protruding shape, a substantially increased quantity of air can be introduced into the air intake opening and then into the air intake passage, accompanied by increase of the ram pressure.

Preferably, the air intake opening is defined in the front cowling at a location above a point of stagnation of the combustion air ready to enter the air intake opening, and the front cowling furthermore preferably has a guide face defined therein at a location below the air intake opening for guiding the combustion air into the air intake opening past the point of stagnation.

According to these structural features, since the air intake opening is defined in the front cowling at a location above the point of stagnation of the air ready to enter the air intake opening, the combustion air of a high ram pressure flowing past this stagnation pint can be smoothly guided along the guide face into the air intake opening immediately above and following the guide face. Therefore, a substantially increased quantity of air can be introduced into the air intake opening and then into the air intake passage, accompanied by further increase of the ram pressure. Also, since even when the head of the vehicle is raised during an acceleration the combustion air flowing past the stagnation point can be guided sufficiently by the guide face into the air intake opening, the high ram pressure can advantageously be secured regardless of any change in posture of the motorcycle during its travel. It is to be noted that the guide face is preferably represented by a curved face effective to introduce the combustion air deep into the air intake opening without being separated therefrom.

In accordance with a third aspect of the present invention, there is provided an air intake system for a vehicle engine which includes a front cowling mounted on a front portion of a vehicle body structure. This vehicle body structure includes a head tube and at least one headlight. The front cowling has a headlight window aligned with the headlight and also has an air intake opening defined therein at a location above the headlight window for introducing an external combustion air towards the vehicle engine. This air intake opening is located above the stagnation point of the air ready to enter the air intake opening. A guide face is defined in the front cowling at a location below the air intake opening for guiding the combustion air into the air intake opening past the point of stagnation.

According to the third aspect of the present invention, since the air intake opening is defined in the front cowling at a location above the point of stagnation of the air ready to enter the air intake opening, the combustion air of a high ram pressure flowing past this stagnation pint can be smoothly guided along the guide face into the air intake opening immediately above and following the guide face. Therefore, a substantially increased quantity of air can be introduced into the air intake opening and then into the air intake passage, accompanied by further increase of the ram pressure. Also, since even when the head of the vehicle is raised during its acceleration the combustion air flowing past the stagnation point can be guided sufficiently by the guide face into the air intake opening, the high ram pressure can advantageously be secured regardless of any change in posture of the vehicle during its travel. In addition, since the air intake opening is defined above the headlight, left and right headlights can be assembled into a single headlight unit and, accordingly, the number of component parts can be reduced accompanied by reduction in cost of manufacture of the motorcycle.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
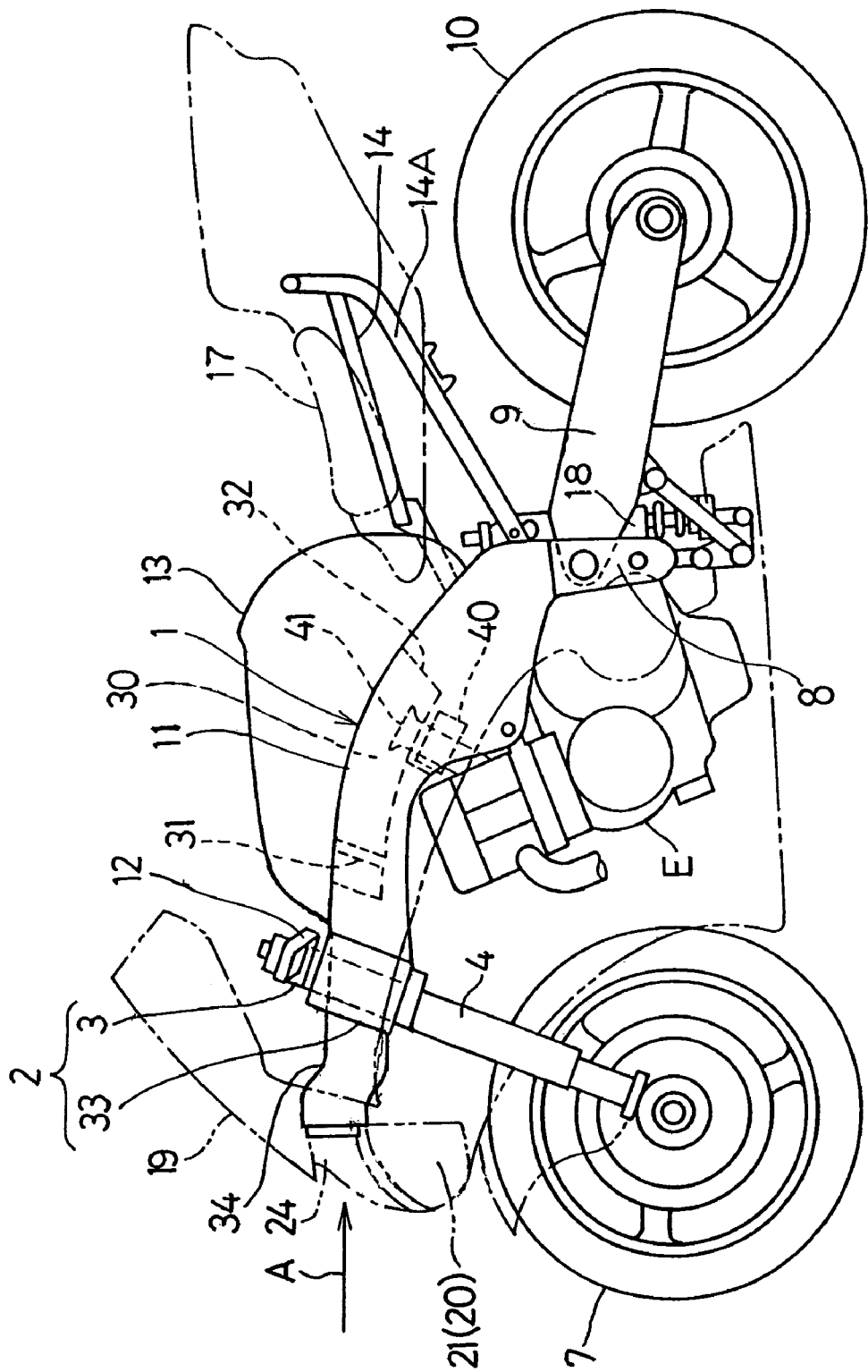
FIG. 1 is a schematic side view of a motorcycle equipped with an air intake system according to a preferred embodiment of the present invention.

Reference will now be made to the accompanying drawings for the detailed description of a preferred embodiment of the present invention. Referring to FIG. 1 showing a schematic side view of a motorcycle equipped with an air intake system according to a preferred embodiment of the present invention, the motorcycle shown therein has a motorcycle frame structure 1 including a head tube 3 formed integrally with a head block 2 at a front end portion of the motorcycle frame structure 1. A front fork 4, which may be telescopic and which rotatably supports a front wheel 7 in a well known manner, is connected with the head tube 3 through a steering shaft (not shown) for rotation relative thereto so that the front wheel 7 can be turned leftwards or rightwards as a handlebar 12 is turned leftwards or rightwards.

On the other hand, the motorcycle frame structure 1 also includes swing arms 9 pivotally connected with swing arm brackets 8 positioned at a generally lower intermediate portion of the motorcycle frame structure 1. A rear drive wheel 10 is rotatably carried by the swing arms 9. A motorcycle combustion engine E is fixedly mounted on a generally lower central portion of the motorcycle frame structure 1 and has its drive output shaft (not shown) drivingly coupled with the rear drive wheel 10 through an endless drive chain (not shown). The motorcycle frame structure 1 furthermore includes a main frame 11 welded at its front end to the head block 2 so as to extend therefrom towards the swing arm brackets 8 and has a fuel tank 13 fixedly mounted thereon.

The main frame 11 has its rear portion to which a seat rail 14 and a reinforcement rail 14A, both cooperating to define a tail portion of the motorcycle frame structure 1 are fitted, and a motorcyclist's seat 17 is fixedly mounted on the seat rail 14. A single rear suspension 18 is interposed between the motorcycle frame structure 1 and the swing arms 9.

Figure 2:
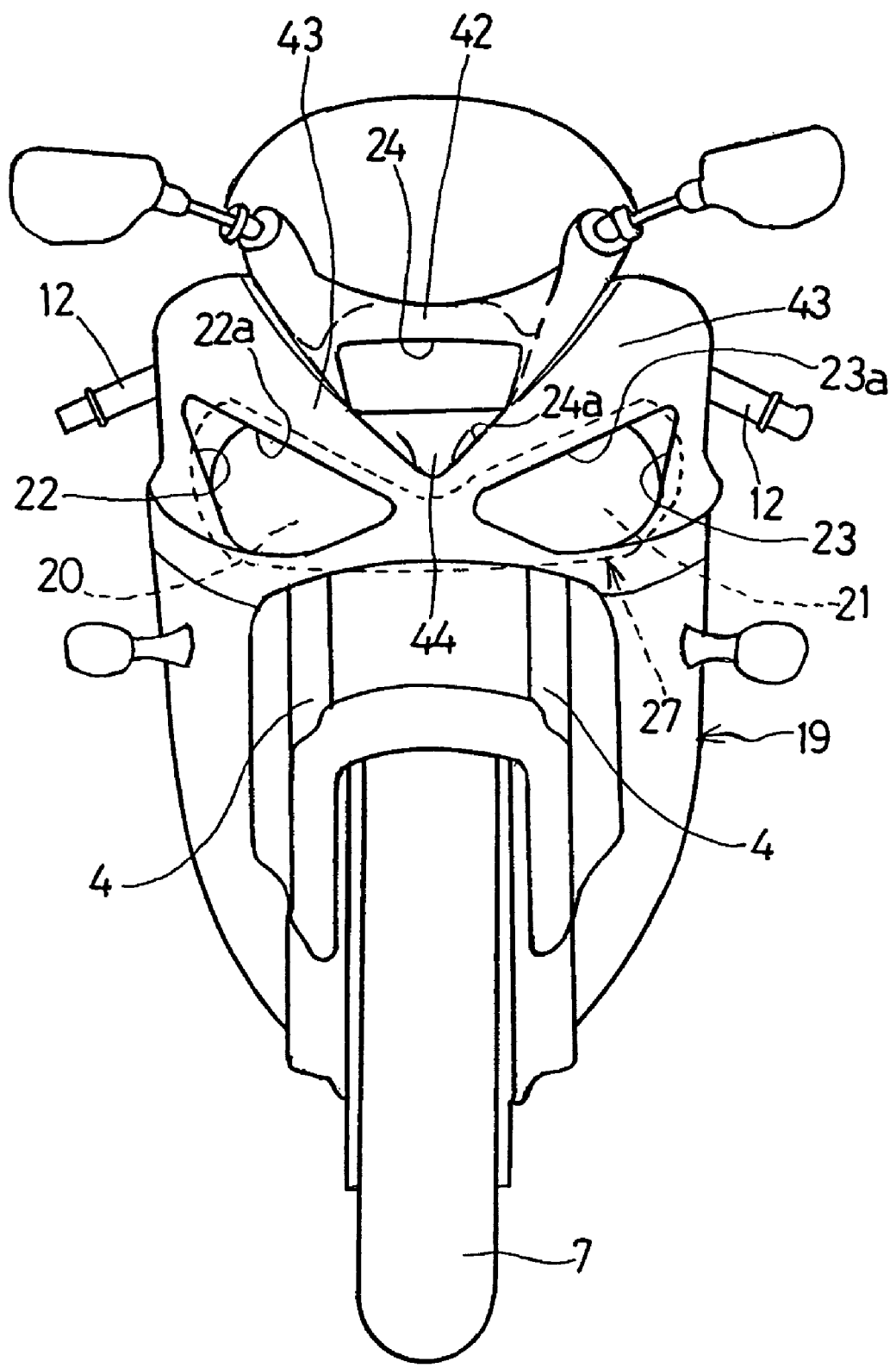
FIG. 2 is a schematic front elevational view of the motorcycle shown in FIG. 1.

Referring now to FIG. 2 showing a schematic front elevational view of the motorcycle, a front cowling or fairing 19 is fitted to the front end portion of the motorcycle frame structure 1 by means of a cowling stay (not shown). This front cowling 19 has left and right headlight windows 22 and 23 defined therein in alignment with associated headlights 20 and 21. The front cowling 19 also has an air intake opening or air scoop 24 defined therein at a location intermediate between and upwardly of the headlight windows 22 and 23 and substantially or generally level with a portion of the head tube 3 (FIG. 1). This air scoop 24 is utilized for introducing a combustion air towards the motorcycle engine E as will be described subsequently. A preferred position of the air scoop 24 is in an area upwardly of respective upper edges 22a and 23a of the headlight windows 22 and 23. Since in the illustrated embodiment each of the headlight windows 22 and 23 represents a generally triangular shape and the respective upper edges 22a and 23a thereof are inclined upwardly from a point intermediate between the headlight windows 22 and 23, a portion of a lower edge 24a of the air scoop 24 overlaps the respective upper edges 22a and 23a of the headlight windows 22 and 23 in a vertical direction.

In view of the fact that the air scoop 24 is defined above the headlight windows 22 and 23 as detailed above, the left and right headlights 20 and 21 are integrated as a single headlight unit 27 and, accordingly, as compared with the structure in which the left and right headlights are arranged independently from each other, the number of component parts used in the motorcycle can advantageously be reduced, resulting in increase of the assemblability.

Figure 3:
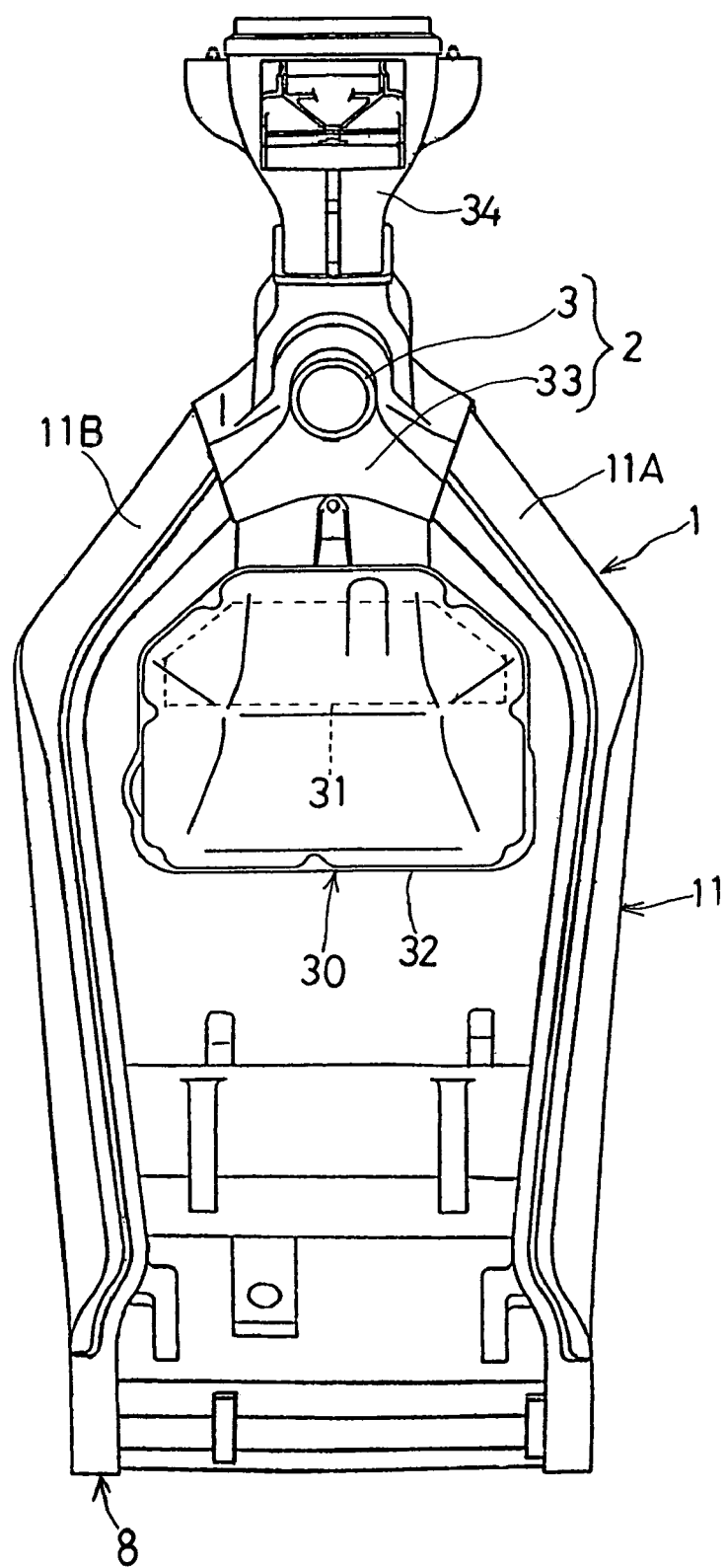
FIG. 3 is a schematic top plan view showing a motorcycle frame structure of the motorcycle.
Figure 4:
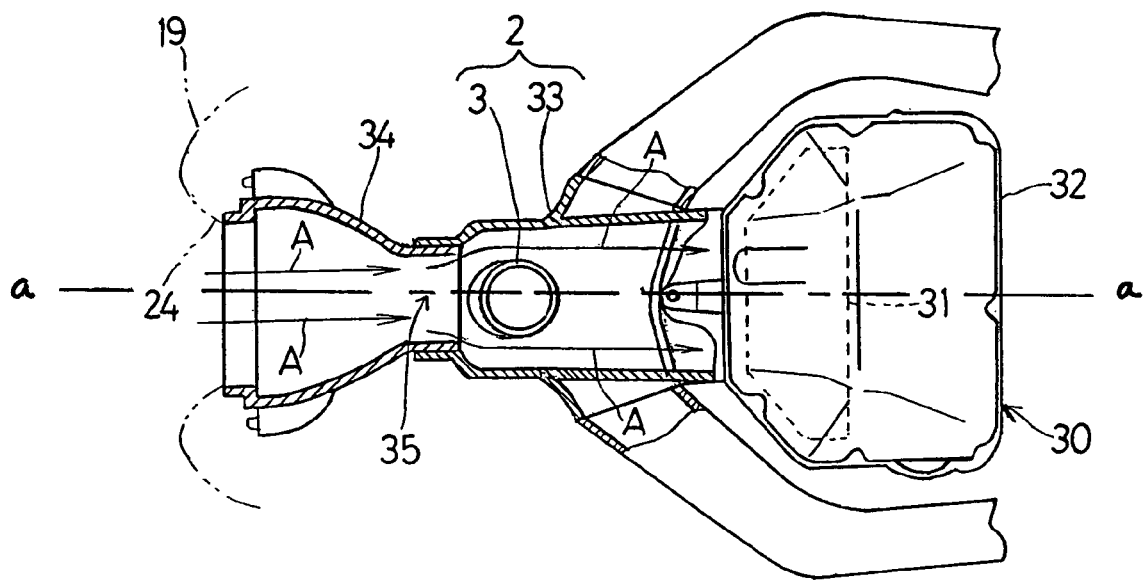
FIG. 4 is a fragmentary top plan view of the motorcycle, showing a front portion thereof.
Figure 5:
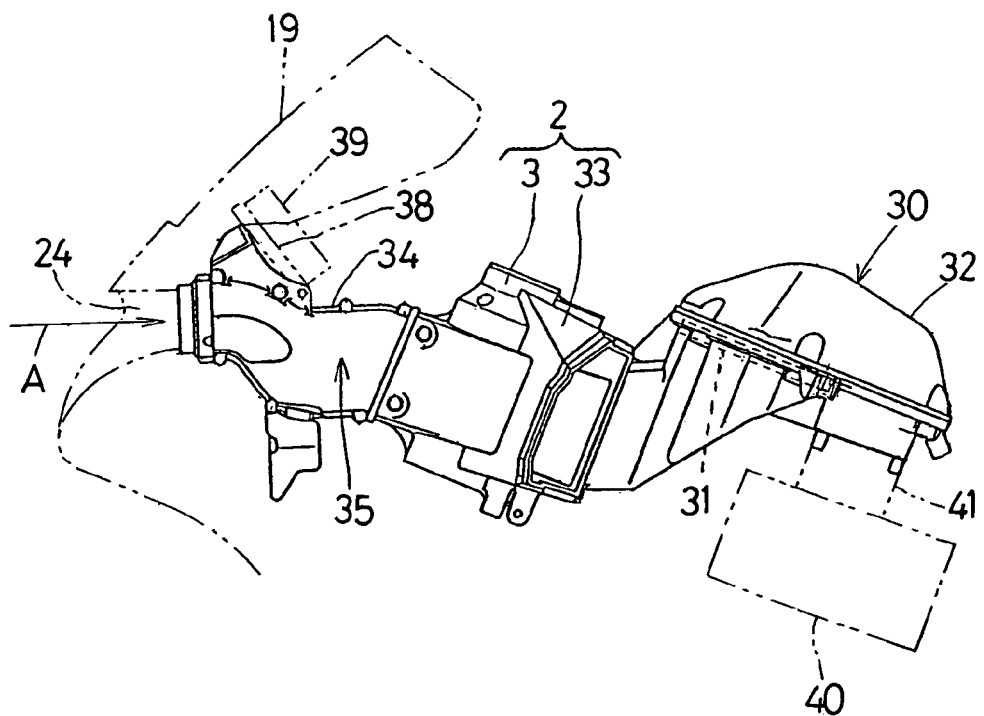
FIG. 5 is a fragmentary side view of the motorcycle, showing an important portion thereof.

As shown in FIG. 4, by the use of a die casting technique, the head block 2 is of one-piece construction formed with an air intake duct 33 opening forwardly and the head tube 3. In other words, the head block 2 is of a design wherein opposite lateral portions of the head tube 3 are utilized as a part of the air intake duct 33 and, accordingly, the motorcycle air intake system of the embodiment of the present invention makes no use of any air intake duct that is separate from the head tube such as found in the conventional motorcycle air intake system. A front open end of the air intake duct 33 is fluid connected with a front air duct 34 which in turn has its front open end positioned to align with the air scoop 24 of the cowling 19 by means of a plurality of set screws (not shown) as shown in FIG. 5. Also, the front air duct 34 has a instrument panel 39 mounted externally thereon by means of a mounting bracket 38. As best shown in FIG. 3, the main frame 11 includes left and right frame segments 11A and 11B welded to and bifurcated from the head block 2 so as to extent generally diagonally downwardly as viewed in FIG. 1, and the swing arm bracket 8 extends downwardly from a rear end of each of the frame segments 11A and 11B of the main frame 11.

As hereinbefore described, the left and right frame segments 11A and 11B of the main frame 11 are bifurcated from the head block 2 so as to extend generally diagonally downwardly, with the swing arm bracket 8 connected to respective rear ends of the frame segments 11A and 11B of the main frame 11. An air cleaner 30 is disposed within an internal space defined in the forked main frame 11, that is, within an internal space delimited between the frame segments 11A and 11B as shown in FIG. 3. This air cleaner 30 includes a cleaner casing 32 having a cleaner element 31 accommodated therein. Specifically, the cleaner casing 32 is fitted to the air intake duct 33 and is, as shown in FIG. 1, supported by a throttle body 40 of the motorcycle engine E. An interior portion of the cleaner casing 32 upstream of the cleaner element 31 with respect to the direction of flow of the combustion air is in communication with the air intake duct 33 as shown in FIG. 4. Accordingly, the front air duct 34 and the air intake duct 33 altogether constitute an air intake passage 35 through which the combustion air A entering the air scoop 24 in the front cowling 19 can be introduced into the air cleaner 30 having flown past laterally of the head tube 3.

As shown in FIG. 1, the cleaner casing 32 is in turn coupled with a plurality of air intake ducts 41 provided in a plurality of fuel supply devices communicated with respective cylinders of the motorcycle engine E. This is particularly true where the motorcycle engine E is of a multi-cylinder type. As such, the combustion air A to be ultimately supplied to the motorcycle engine E flows from the air scoop 24 in the front cowling 19 into the front air duct 34 of the air intake passage 35 and then into the air intake duct 33, which is a rear portion of the air intake passage 35, after having passed laterally of the head tube 3 as shown by the arrows in FIG. 4. The combustion air A is subsequently supplied from a rear end of the air intake duct 33 into the cleaner casing 32. After the combustion air has been cleaned by the cleaner element 31 within the cleaner casing 32, it flows from a clean air room at a downstream portion of the cleaner casing 32 to the ducts 41 and finally flows into the throttle body 40 where the cleaned air is mixed with a fuel to provide an air-fuel mixture.

In the motorcycle air intake system embodying the present invention, as best shown in FIG. 2, the air scoop 24, shown as a trapezoid, is defined in the front cowling 19 at a location between and above the left and right headlight windows 20 and 21 so that the combustion air A entering from outside into the front air duct 34 through the air scoop 24 can be guided into the air cleaner 30, that is positioned rearwardly of the head tube 3 and is generally level with the position of the head tube 3 as shown in FIGS. 4 and 5. During the flow of the combustion air A towards the air cleaner 30 by way of the air intake passage 35, the combustion air A flows past the lateral portions of the head tube 3 enclosed within the air intake duct 33 in the head block 2 at a location substantially level with the air scoop 24 as shown in FIGS. 4 and 5 and aligned with a longitudinal axis, a-a, of the main frame 11.

Accordingly, a portion of the air intake passage 35 between the air scoop 24 and that portion of the head tube 3 enclosed within the air intake duct 33 can extend generally straight, i.e., can extend having a minimized curvature without being unduly bent and, hence will not pose an undesirable resistance to the flow of the combustion air A, resulting in increase of the ram pressure of the air being introduced towards the air cleaner 30. Also, the internal space of the forked main frame 11, i.e., the space between the frame segments 11A and 11B is effectively utilized to accommodate the air cleaner 30 so that the latter can be substantially level with the position of the head tube 3.

In this air intake system as shown in FIG. 4, as the combustion air A flowing into the air intake duct 33 is deflected in contact with that portion of the head tube 3 so as to flow past the lateral portions of the head tube 3, moisture components, such as, for example, raindrops contained in the combustion air A can collide against an outer peripheral surface of the head tube 3 then acting to cut the moisture components so that the moisture components so cut by that portion of the head tube 3 can be subsequently drained to the outside through one or more drain perforations defined in an air intake area of the cleaner casing 32. Accordingly, with a simplified structure, the air intake system embodying the present invention is effective to prevent the moisture components from wetting the cleaner element 31.

Figure 6:
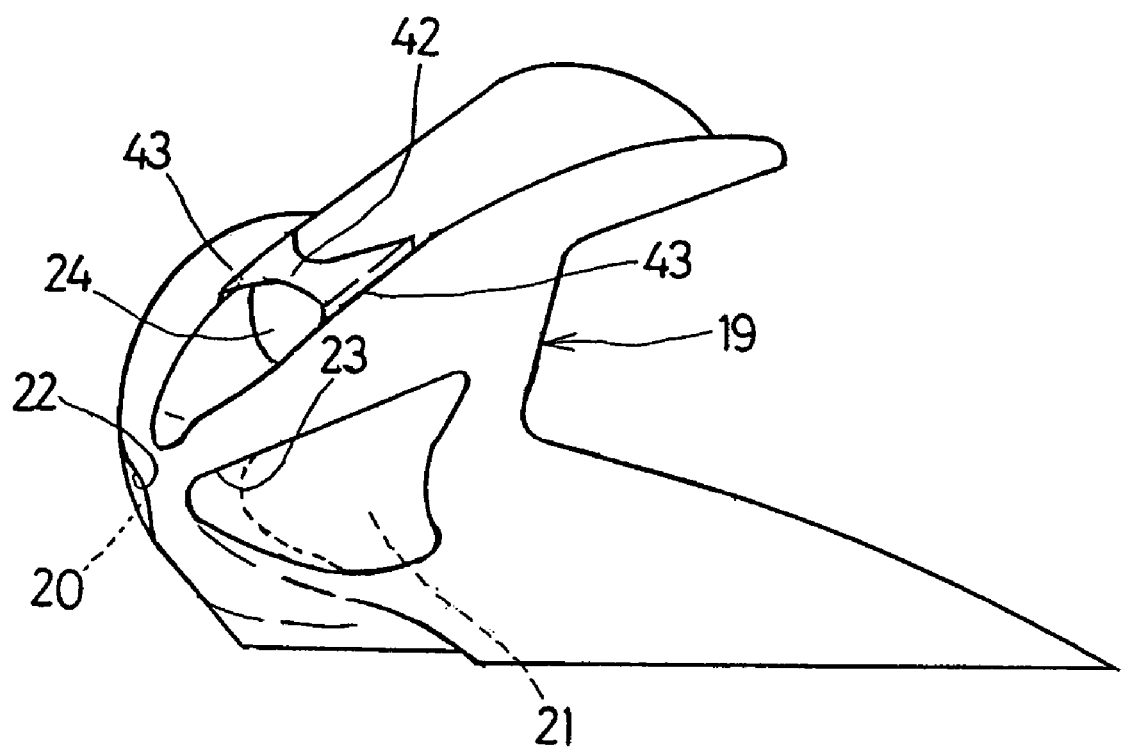
FIG. 6 is a schematic perspective view of a front cowling employed in the motorcycle.

As best shown in FIG. 6, an upper peripheral portion 42 of the air scoop 24 in the front cowling 19 is swelled outwardly (i.e., outwardly upwardly, in the illustrated embodiment) of the front cowling 19 beyond left and right opposite side regions 43 of the air scoop 24 that are continued from the upper peripheral portion 42. Thus the upper peripheral portion 42 defines a curved wall. As can readily be seen from FIG. 7A, an upper edge portion of the air scoop 24 necessarily assume such a shape as to protrude forwardly in the presence of the curved wall 42 and, accordingly, the combustion air A can be efficiently introduced into the air scoop 24 in an increased quantity to allow the ram pressure to be further increased.

Figure 7A:
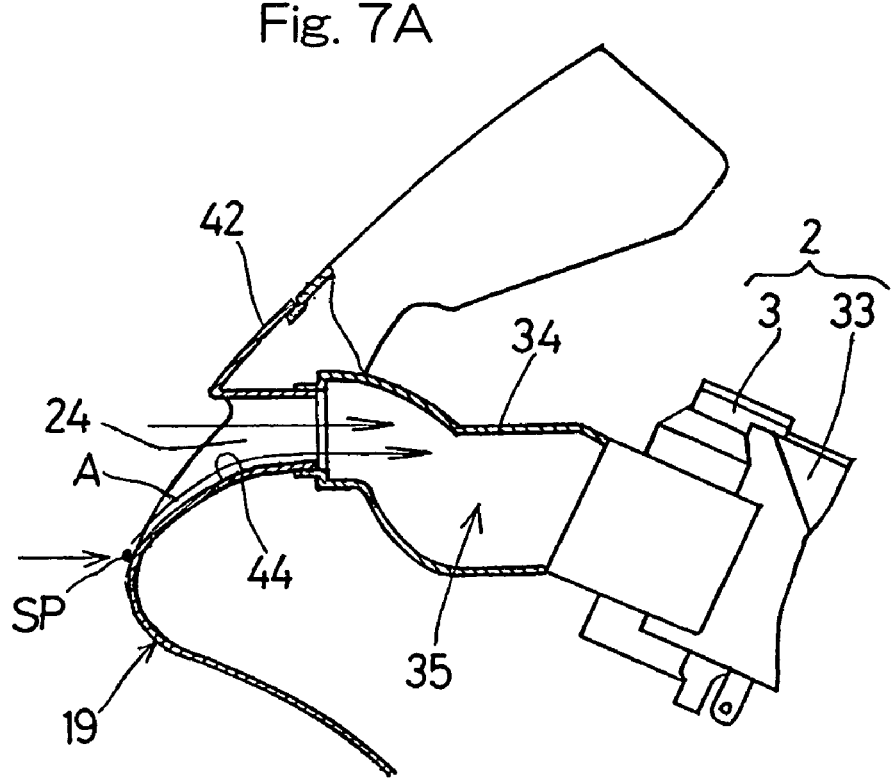
FIGS. 7A and 7B are fragmentary side sectional views of the front cowling, showing how a combustion air enters an air intake opening or air scoop during a normal travel and an acceleration of the motorcycle, respectively.
Figure 7B:
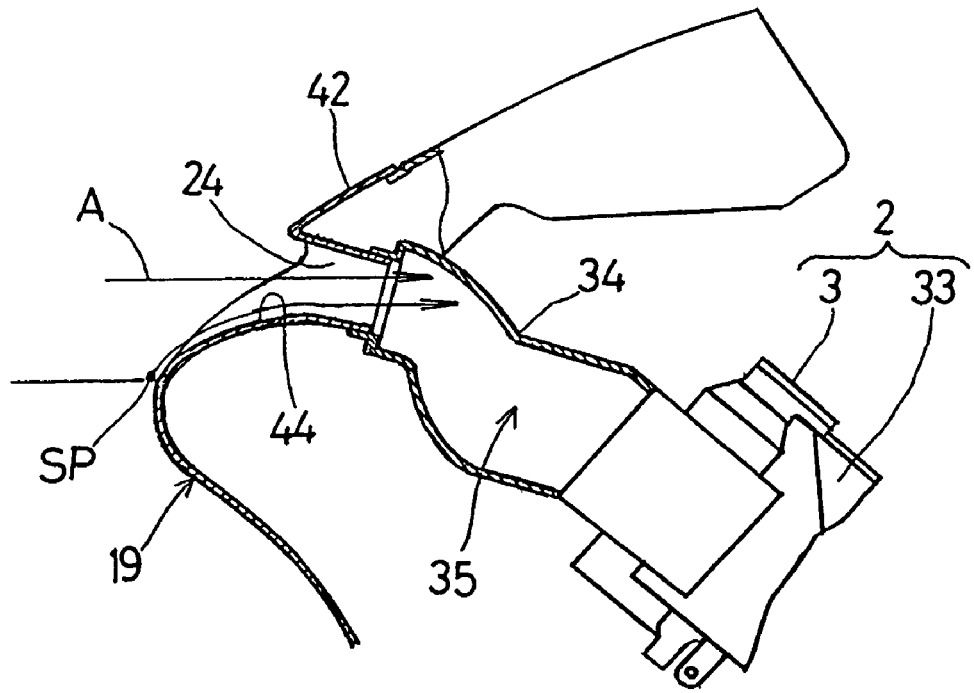
Figure 8A:
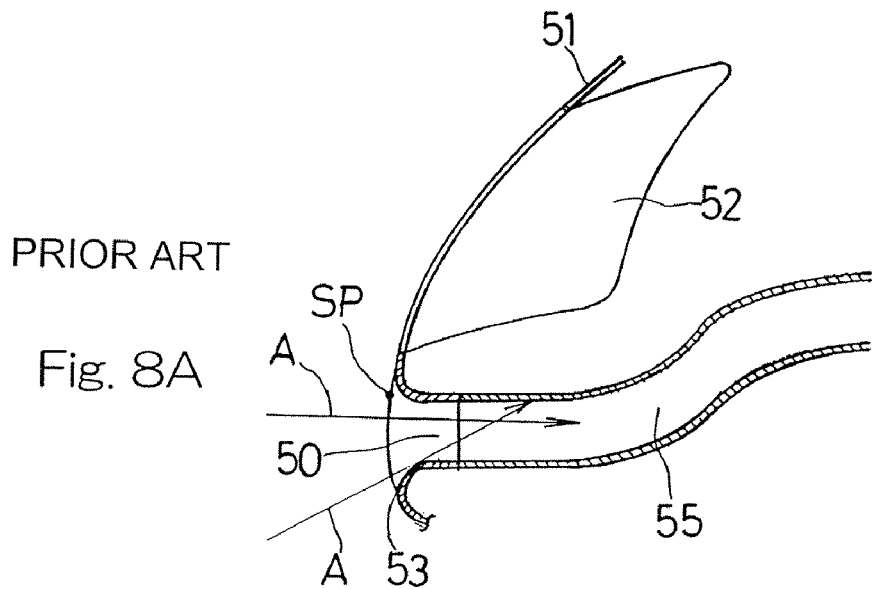
FIGS. 8A to 8C are fragmentary side sectional views of the front cowling employed in the conventional motorcycle, showing how the combustion air enters an air intake opening or air scoop when the standard motorcycle is in normal posture, head-down posture and head-up posture, respectively.
Figure 8B:
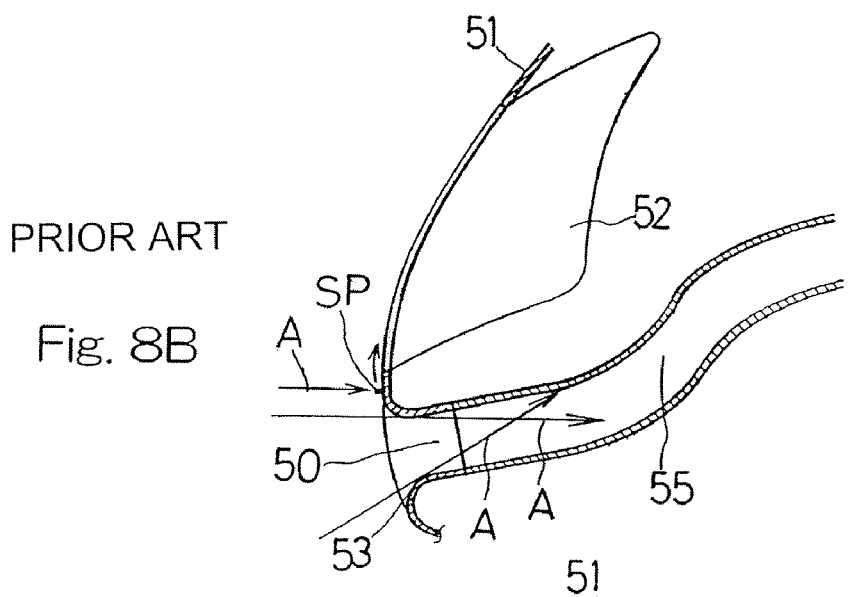
Figure 8C:
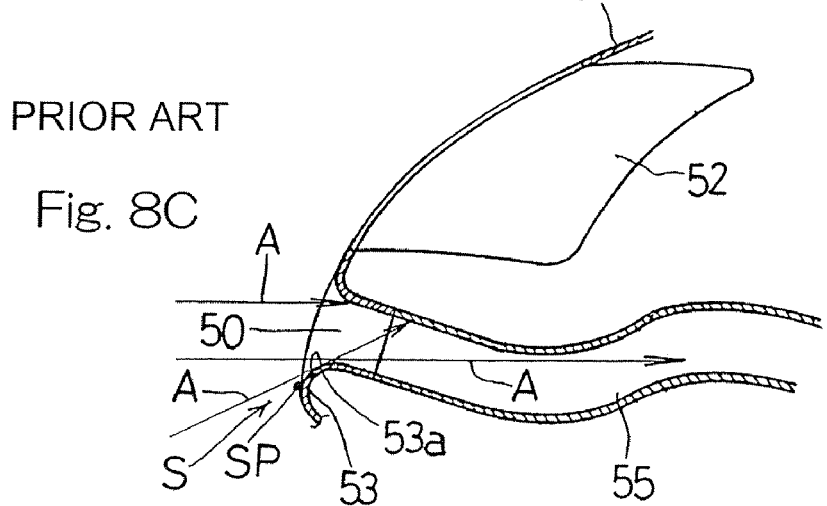

Also, in accordance with the present invention, as clearly shown in FIGS. 7A and 7B, the air scoop 24 is defined at a location upwardly of the point of stagnation SP of the air A flowing relatively towards the front cowling 19. At the same time, a portion of the front cowling 19 below the air scoop 24 protrudes forwardly and is curved outwardly downwardly from a front end of the front air duct 34 to thereby define a curved guide face 44 for smoothly guiding the combustion air A into the air intake passage 35 through the air scoop 24.

It may occur that if the combustion air A flows into the air scoop 24 in a condition separated from a surface of the front cowling 16, a flow passage for the combustion air A will be narrowed, reducing the amount of air introduced into the air intake passage 35 through the air scoop 24. However, in the motorcycle utilizing the air intake system of the embodiment of the present invention, since the air scoop 24 is positioned above the stagnation point SP which is located at a forward nose position of the front cowling 19, and, on the other hand, the combustion air A having a high ram pressure at the stagnation point SP can be smoothly guided along the smoothly curved guide face 44 into the air scoop 24 above the stagnation point SP without having separated therefrom, an increased quantity of air can be advantageously introduced into the air scoop 24 to thereby further increase the ram pressure.

While FIG. 7A illustrates the posture of the motorcycle during a normal forward travel, FIG. 7B illustrates the posture of the motorcycle during an acceleration. As shown in FIG. 7B, during the acceleration, the front or "head" of the motorcycle is raised. Even during the acceleration, the combustion air flowing past the stagnation point SP can be sufficiently guided into the air scoop 24 by the curved guide face 44 without being separated therefrom and, therefore, regardless of the posture of the motorcycle the ram pressure of the air at the air scoop 24 will not almost vary.

Although the present invention has been fully described in connection with the preferred embodiment thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. An air intake system for a vehicle engine which comprises:

a front cowling mounted on a front portion of a vehicle body structure, the vehicle body structure including a head tube and a left and a right headlight, said front cowling having left and right headlight windows aligned with the left and right headlights, said front cowling also having an air intake opening for introducing an air flow for a combustion air towards the vehicle engine, said air intake opening being defined intermediate between and upwardly of the left and right headlights and also defined above and in alignment with a nose of the front cowling positioned between the left and right headlight windows in a longitudinal axis direction of the vehicle body structure; and an air intake passage for introducing the combustion air, then entering the air intake opening, towards an air cleaner disposed rearwardly of the head tube at the same level with the head tube, the combustion air passing a portion of the head tube, which portion extends through the air intake passage between the air intake opening and the air cleaner and at the same level with the air intake opening to form a portion of the air intake passage, wherein the front cowling furthermore has a guide face that is so defined therein as to extend from the nose of the front cowling to the air intake opening for guiding into the air intake opening the combustion air past the nose of the front cowling.

2. The air intake system for a vehicle engine as claimed in claim 1, wherein the vehicle body structure includes a forked main frame including two frame segments, the frame segments extending rearwardly from the head tube and wherein the air cleaner includes a cleaner casing and a cleaner element accommodated within the cleaner casing, the cleaner casing being disposed within an internal space delimited between the frame segments.

3. The air intake system for a vehicle engine as claimed in claim 1, wherein the left and right headlights are integrated as a single headlight unit.

4. The air intake system for a vehicle engine as claimed in claim 1 wherein the air passage disposed rearwardly of the head tube consists of a substantially constant singular cross sectional opening to the air cleaner.

5. The air intake system for a vehicle engine as claimed in claim 4 wherein the head tube provides a circular surface directly contacting the air flow of combustion air upstream of the air cleaner.

6. An air intake system for a motorcycle engine mounted on a frame and having a head tube attached to handlebars with an air cleaner mounted above the motorcycle engine and longitudinally aligned with an axis of the frame and the head tube, comprising:
   a front cowling mounted on a front portion of the frame forward of the head tube and having left and right headlight windows for receiving left and right headlights;
   an air intake opening provided on the front cowling and aligned with the longitudinal axis, the air intake opening having an upper peripheral portion extending outward and forward from the front cowling, the air intake opening mounted above and between the left and right headlights and positioned above and in alignment with a nose of the front cowling positioned between the left and right headlight windows in the longitudinal direction of the vehicle body structure;
   an air duct connected to the air intake opening and extending to the air cleaner, the head tube extending through the air duct between the air intake opening and the air cleaner and forming a portion of the air duct, for direct contact with flowing air in the air duct, the air duct extending approximately horizontally in a straight path from the air intake opening to the air cleaner; and
   wherein the front cowling has a lower curved guide face extending outward and downward between the intake opening and the nose of the front cowling.

7. The air intake system for a motorcycle engine as claimed in claim 6 wherein the air intake opening has a trapezoidal configuration.

8. An air intake system for a vehicle engine which comprises:
   a front cowling mounted on a front portion of a vehicle body structure, the vehicle body structure including a head tube and left and right headlights, said front cowling having left and right headlight windows aligned with the left and right headlights, said front cowling also having an air intake opening for introducing an air flow for a combustion air towards the vehicle engine, said air intake opening being defined intermediate between and upwardly of the left and right headlights and also defined above and in alignment with a nose of the front cowling positioned between the left and right headlight windows in a longitudinal axis direction of the vehicle body structure;
   an air intake passage for introducing the combustion air, then entering the air intake opening, towards an air cleaner disposed rearwardly of the head tube at the same level with the head tube, the combustion air passing a portion of the head tube, which portion extends through the air intake passage between the air intake opening and the air cleaner and at the same level with the air intake opening to form a portion of the air intake passage; and
   wherein the air intake opening has an upper peripheral edge and a pair of side peripheral edges and the front cowling has an upper peripheral portion continued from the upper peripheral edge of the air intake opening and a pair of side peripheral portions continued from the side peripheral edges of the air intake opening, the upper peripheral portion of the front cowling being curved outwardly of the front cowling between the pair of the side peripheral portions of the front cowling.

9. The air intake system for a vehicle engine as claimed in claim 8, wherein the vehicle body structure includes a forked main frame, the forked main frame including two frame segments that extend rearwardly from the head tube and wherein the air cleaner includes a cleaner casing and a cleaner element accommodated within the cleaner casing, the cleaner casing being disposed within an internal space delimited between the frame segments.

10. An air intake system for a vehicle engine which comprises:
   a front cowling mounted on a front portion of a vehicle body structure, the vehicle body structure including a head tube and left and right headlights integrated as a single headlight unit, said front cowling having left and right headlight windows aligned with the left and right headlights, said front cowling also having an air intake opening for introducing an air flow for a combustion air towards the vehicle engine, said air intake opening being defined intermediate between and upwardly of the left and right headlights and also defined above a nose of the front cowling positioned between the left and right headlight windows when a direction of air flow impacting the front cowling is parallel to a longitudinal axis of the vehicle body structure.

* * * * *